United States Patent [19]
Giacomino et al.

[11] Patent Number: 6,032,919
[45] Date of Patent: Mar. 7, 2000

[54] GAS FLOW PROPORTIONING AND CONTROLLING VALVE SYSTEM

[76] Inventors: Jeff L. Giacomino; Bruce M. Victor, both of 1762 Denver Ave., Fort Lupton, Colo. 80621

[21] Appl. No.: 09/120,494

[22] Filed: Jul. 21, 1998

Related U.S. Application Data

[60] Provisional application No. 60/053,683, Jul. 24, 1997.

[51] Int. Cl.[7] ................................................... F16K 31/02
[52] U.S. Cl. .................................... 251/30.02; 137/596.17
[58] Field of Search ............................. 251/30.01, 30.02, 251/30.03, 30.04, 28; 137/596.17

[56] References Cited

U.S. PATENT DOCUMENTS

| | | |
|---|---|---|
| 2,662,542 | 12/1953 | Logan et al. . |
| 3,036,585 | 5/1962 | Shawhan . |
| 3,219,046 | 11/1965 | Waugh . |
| 3,415,264 | 12/1968 | Brown et al. . |
| 3,437,312 | 4/1969 | Jenny . |
| 3,474,815 | 10/1969 | Beahm et al. . |
| 3,581,759 | 6/1971 | Veale . |
| 3,705,792 | 12/1972 | Peters . |
| 4,183,384 | 1/1980 | Ervin et al. . |
| 4,241,750 | 12/1980 | Furuse et al. . |
| 4,961,441 | 10/1990 | Salter ................................ 251/30.02 X |
| 5,042,775 | 8/1991 | Willemsen ............................ 251/30.02 |

OTHER PUBLICATIONS

Kimray, Inc., 1"& 2" High Pressure Motor Valve, p.E1:10.1 dated Jan. 1994.

EEMCO, Division of Datron Systems Inc., Two and Three-Way Latching Valves, 2 pages, No Date.

*Primary Examiner*—Kevin Lee
*Attorney, Agent, or Firm*—Flanagan & Flanagan; John R. Flanagan; John K. Flanagan

[57] ABSTRACT

A gas flow proportioning and controlling valve system includes a pressurized air flow source, a flow control valve, first and second latching valves and a control mechanism. The control valve is capable of pneumatic actuation between fully opened and closed positions permitting and preventing gas flow through it and to selected intermediate positions to provide proportionately greater and lesser opening of the control valve and magnitude of pressure and velocity of gas flow through it. The first latching valve is connected to the source, control valve and a vent line and is switchable between an opened condition in which communication of pressurized air flow is only provided therethrough from the source to the control valve and a closed condition in which communication of pressurized air flow is only provided therethrough from the control valve to the vent line. The second latching valve is connected to the vent line from the first latching valve and to atmosphere and is switchable between an opened condition in which communication of pressurized air flow is only provided therethrough from the vent line to atmosphere and a closed condition wherein communication of pressurized air flow is not provided therethrough. The control mechanism is operable to cause selective and separate switching of the latching valves between their respective opened and closed conditions in a coordinated manner which causes pneumatic actuation of the control valve to any selected intermediate position between fully opened and closed positions.

15 Claims, 3 Drawing Sheets

GAS FLOW PROPORTIONING AND CONTROLLING VALVE SYSTEM

This application claims the benefit of U.S. provisional application No. 60/053,683, filed Jul. 24, 1997.

BACKGROUND OF THE INVENTION

1. Field of the Invention

The present invention generally relates to production of gas and oil using plunger lift technology and, more particularly, is concerned with a valve system for proportioning and controlling flow in a gas sales line of a gas-producing well.

2. Description of the Prior Art

Many gas and oil wells employ a gas flow control valve, known as a "motor valve", that is opened or closed to respectively allow production from or shut-in of the well. The flow control valve commonly used is one that is spring biased to normally assumes a closed condition and requires a supply of external pressurized air above a predetermined level, such as 35 psi, to pneumatically cause opening of the flow control valve against the spring bias. Once the flow control valve is opened, any further supply of external pressurized air to the flow control valve can be cutoff, since the pressurized air already supplied to pneumatically actuate the flow control valve will be retained in it and hold it in the opened condition. To close the flow control valve, the pressurized air retained therein merely is vented off to the atmosphere.

In order to maximize product sales income from a well, it desirable to limit the flow of gas and oil from the well to a sales line to below a maximum operational setting at which a charting device (connected to the sales line records the flow pressure through the line over time. Frequently when a well is first opened by the flow control valve, a spike or surge in the flow pressure is experienced over a short period of time. This surge typically goes well above the maximum operational setting at which the charting device is capable of recording flow pressure. When the maximum setting is exceeded this is referred to in the industry as going "off the chart". The gas and oil producer is not paid for the portion of the product that enters the sales line at a flow pressure that is "off the chart". This quantity of gas and oil can be viewed as an "off the chart" giveaway by the well producer to the gas and oil company purchasing the production. Also, in order to maximize product sales income from a well, it desirable to regulate the velocity of flow of gas and oil from the well so that a separator downstream of the flow control valve can function properly to separate oil from the gas and thereby prevent oil from being suspended and carried with the gas to the sales line and, in effect, given away free to the gas company buying only the gas from the well.

To eliminate "off the chart" and suspended oil giveaways the flow pressure and velocity of the gas and oil must at all times be controlled and regulated so that it will not exceed the maximum operational setting of the charting device and not prevent the separator from performing its intended function. One way to do this is to control and regulate the actuation of the flow control valve from the closed to opened condition. There are proportioning valves on the market which can be used to accomplish this, that is, by controlling the supply pressure to the flow control valve so that it is only opened a desired "percentage" instead of fully open. The flow pressure through the flow control valve will be proportional to the "percentage" open of the flow control valve.

However, problems exist with respect to all prior art commercially-available proportioning valves. They are complex devices, high in price, and require more electrical power to operate than is available from the photovoltaic cells and batteries typically utilized at remote wellhead sites. Thus, none of the commercial-available proportioning valves are economically feasible to use for this application. A high-low controller costing around a thousand dollars is typically purchased by the well producer and employed at the well site as a safety shut-down and turn-on device connected to the flow control valve to prevent the flow pressure from exceeding or falling below an acceptable range, such as 200 psi maximum and 50 psi minimum, to both protect the well and downstream equipment. (The maximum limit does not prevent the previously-described "off the chart" giveaway situation from occurring.) If any of the prior art proportioning valves currently available on the market were incorporated into the high-low controller, that would effectively double its cost. This would not be acceptable to well producers. Furthermore, there is insufficient extra electrical power available from the photovoltaic cells and batteries used to operate the high-low controller to meet the energy demand of such a high power-consuming proportioning valve.

Consequently, a need remains for an improved proportioning valve system which provides a solution to the aforementioned problems with prior art proportioning values without introducing any new problems in place thereof.

SUMMARY OF THE INVENTION

The present invention provides a gas flow proportioning and controlling valve system designed to satisfy the aforementioned need. The proportioning and controlling valve system of the present invention provides a solution to the above-described problem by incorporating two commerically-available solenoid-type latching valves which are low in cost and simple in construction and require low energy to operate in that energy is only required to switch the latching valves between their opened and closed conditions where they are then retained by internal permanent magnets at the one or the other of the respective opened and closed conditions. The latching valves are connected to one another and one of the latching valves is connected to a flow control valve and a source of pressurized air flow in an arrangement that by coordinated switching of the latching valves between their respective opened and closed conditions will cause or permit pneumatic actuation of the flow control valve to selected intermediate positions between fully closed and opened positions so as to thereby provide a proportionate or percentage opening of the flow control valve and change in the magnitude of gas flow pressure and velocity to the sales line.

Accordingly, the present invention is directed to a gas flow proportioning and controlling valve system which comprises: (a) a source of pressurized air flow; (b) a flow control valve capable of pneumatic actuation between fully opened and closed positions corresponding permitting and preventing gas flow therethrough and to selected intermediate positions progressively increasing and decreasing between the fully closed to opened positions to provide a proportionately greater and lesser opening of the flow control valve and magnitude of the pressure and velocity of gas flow therethrough; (c) a first latching valve connected to the source of pressurized air flow, to the flow control valve and to a vent line and being switchable between an opened condition in which communication of pressurized air flow is only provided therethrough from the source of pressurized air flow to the flow control valve and a closed condition in which communication of pressurized air flow is only provided therethrough from the flow control valve to the vent line; (d) a second latching valve connected to the vent line from the first latching valve and to atmosphere and being switchable between an opened condition in which communication of pressurized air flow is only provided therethrough from the vent line to atmosphere and a closed condition wherein no communication of pressurized air flow is provided therethrough; and (e) a control mechanism operable to cause selective and separate switching of the first and second latching valves between their respective opened and closed conditions in a coordinated manner which causes pneumatic actuation of the flow control valve to any of the selected intermediate positions between the fully opened and closed positions.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INTENTION

Figure 1:
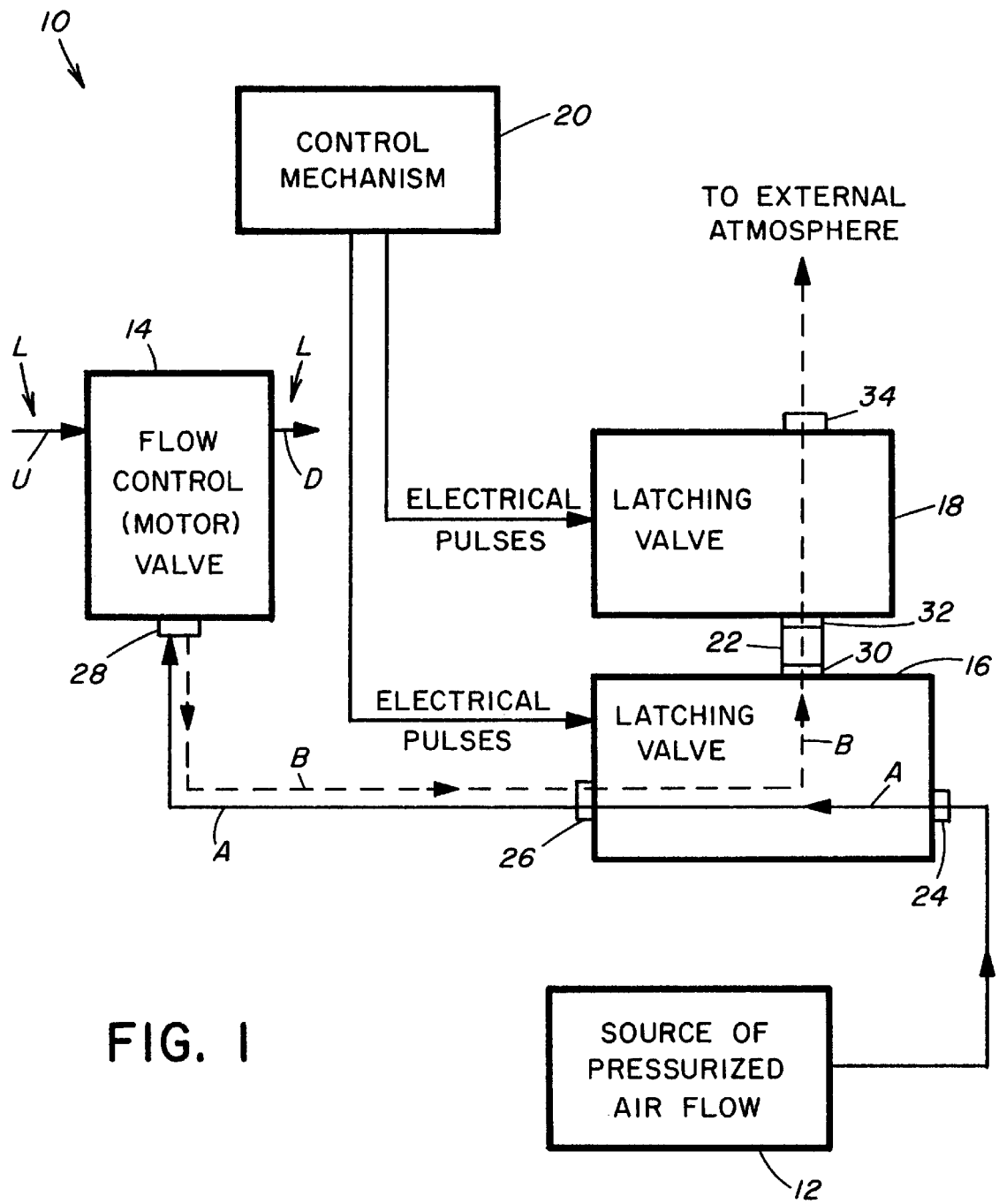
FIG. 1 is a diagrammatic representation of a gas flow proportioning and controlling valve system of the present invention utilizing a pair of latching valves with a flow control valve.

Referring to the drawings and particularly to FIG. 1, there is illustrated a valve system of the present invention, generally designated 10, for proportioning and controlling flow in a gas flow line L, such as a gas sales line of a gas-producing well (not shown). The valve system 10 basically includes a source 12 of pressurized air flow, a motor or flow control valve 14 interposed in the gas flow line L between an upstream portion U and a downstream portion D thereof, first and second latching valves 16, 18 employed with the flow control valve 14 and being switchable between only two, namely opened and closed, conditions, and a control mechanism 20 operable to control switching of the first and second latching valves 16, 18 between their two conditions.

More particularly, the motor or flow control valve 14 is capable of pneumatic actuation between fully opened and closed positions corresponding permitting and preventing gas flow therethrough and to selected intermediate positions between the fully closed position and opened position to provide a proportionately greater and lesser opening of the flow control valve 14 and magnitude of the pressure and velocity of gas flow therethrough. The first latching valve 16 is connected to the source 12 of pressurized air flow, to the flow control valve 14 and to a vent line 22. The first latching valve 16 is switchable between an opened condition in which communication of pressurized air flow is only provided therethrough from the source 12 of pressurized air flow to the flow control valve 14 and a closed condition in which communication of pressurized air flow is only provided therethrough from the flow control valve 14 to the vent line 22. The second latching valve 18 is connected to the vent line 22 from the first latching valve 16 and to atmosphere. The second latching valve 18 is switchable between an opened condition in which communication of pressurized air flow is only provided therethrough from the vent line 22 to atmosphere and a closed condition wherein communication of pressurized air flow is blocked therethrough.

Figure 2:
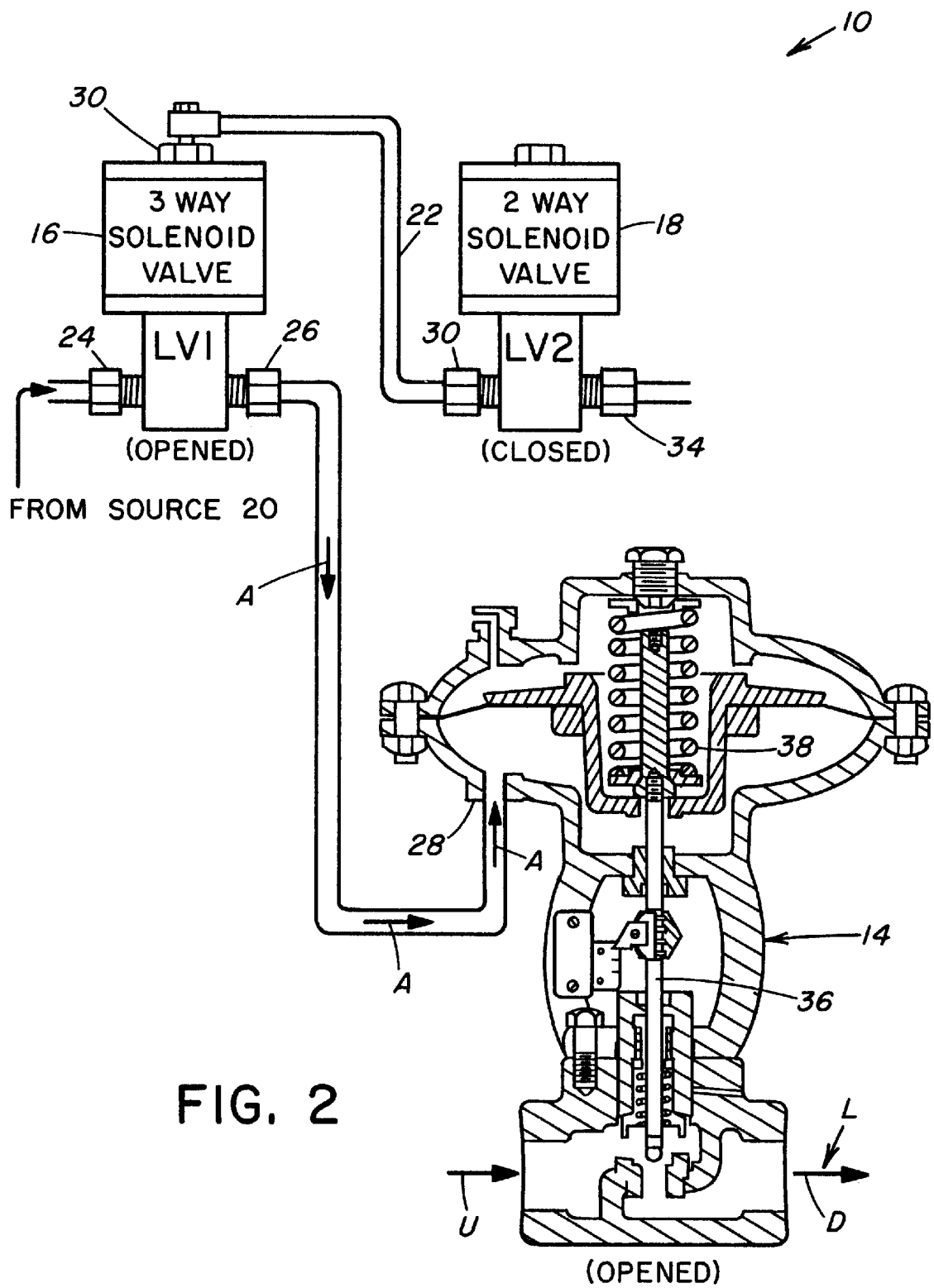
FIG. 2 is a schematic representation of one practical implementation of the valve system of the present invention showing the flow control valve interposed in a gas flow line and actuated to an opened position.
Figure 3:
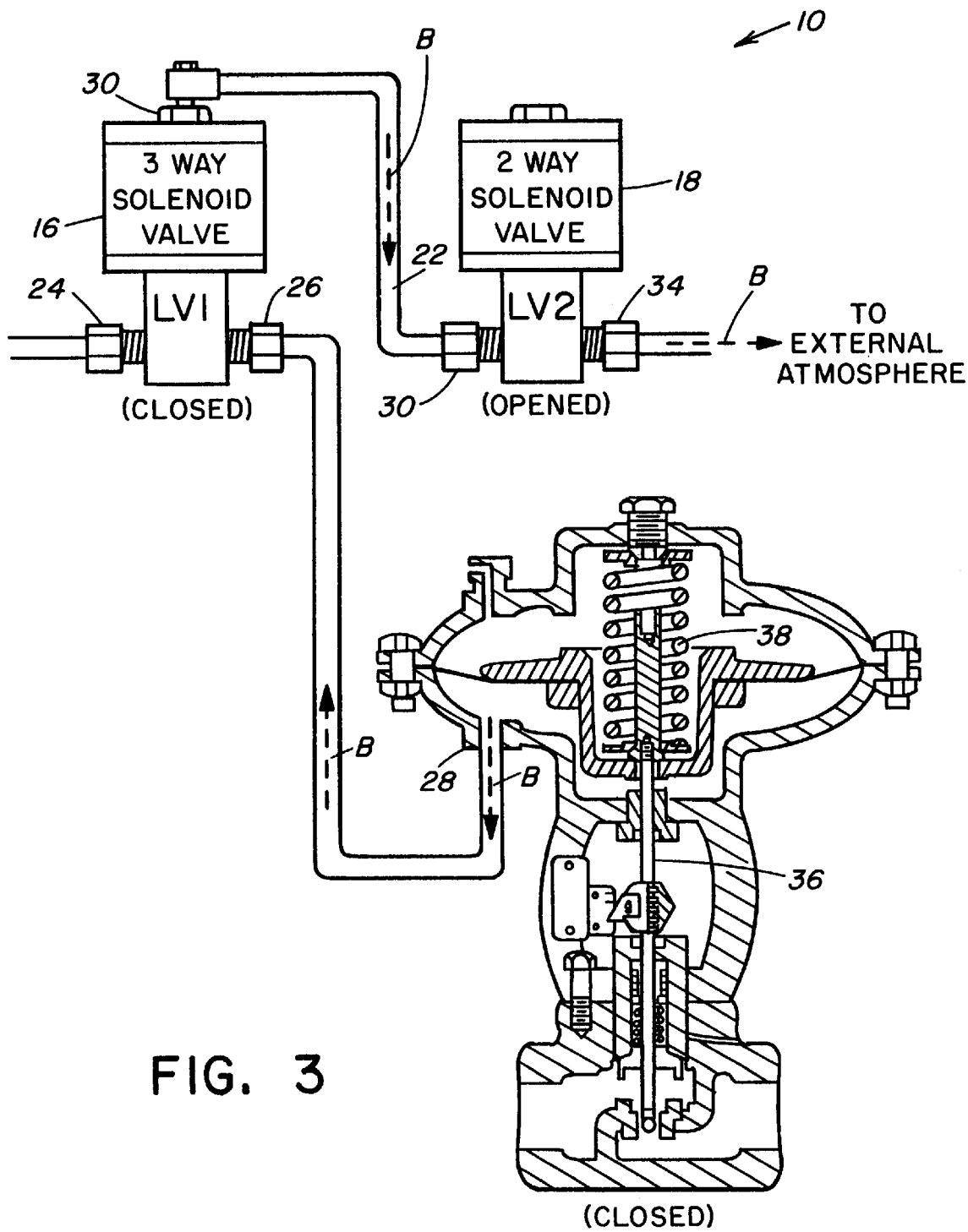
FIG. 3 is a schematic representation of the valve system similar to that of FIG. 2 but showing the flow control valve actuated to a closed position.

As seen in FIGS. 2 and 3, the latching valves 16, 18 can be implemented as two commerically-available solenoid type latching valves which are low in cost and simple in construction and require low electrical energy to operate. Electrical energy is only required to switch the latching valves 16, 18 between their two, opened and closed, conditions, with a permanent magnet utilized internally by each to retain the latching valve 16, 18 at the one or the other of its respective opened and closed conditions. The control mechanism 20 is a suitable electronic device operable to cause selective and separate switching of the first and second latching valves 16, 18 between their respective opened and closed conditions in a coordinated manner which causes pneumatic actuation of the flow control valve 14 to any of the selected intermediate positions between the fully opened and closed positions. The control mechanism 20 applies first and second electrical pulses respectively to the first and second latching valves 16, 18 to actuate them between their opened and closed conditions. practical design of an electronic device to implement the control mechanism 20 need not be described in detail herein, such being well within the capability of one of ordinary skill in the art without the exercise of undue experimentation. In order to achieve the desired proportionate opening of the flow control valve 14, the first and second latching valves 16, 18, must be capable of switching between their respective opened and closed conditions in a fraction of the time it takes the pneumatically actuated motor or flow control valve 14 to change between its closed and fully opened positions. The employment of electrically-operated solenoid type of latching valves 16, 18 such as the ones commercially-available from EEMCO a division of Datron System, Inc., will meet this requirement.

The first latching valve 16 has a first port 24 connected to the source 12 of pressurized air flow, a second port 26 connected to a port 28 of the flow control valve 14, and a third port 30 connected the vent line 22. The second latching valve 18 has a first port 32 connected to the vent line 22 from the first latching valve 16 and a second port 34 venting to atmosphere. The first and second latching valves 16, 18 are actuatable between opened and closed positions by application of respective first and second electrical pulses thereto by operation of the control mechanism 20.

In the opened condition of the first latching valve 16, flow communication is only established therethrough between the first and second ports 24, 26 thereof whereas, in the closed condition of the first latching valve 16, flow communication is only established therethrough between the second and third ports 26, 30 thereof. In the opened condition of the second latching valve 18, flow communication is only established therethrough between the first and second ports 32,34 thereof whereas, in the closed condition of the second latching valve 18, there is no flow communication established through the second latching valve 18.

With the second latching valve 18 maintained in the closed condition, cycling or toggling of the first latching valve 16 between closed and opened conditions will produce pulses of pressurized air flow along a solid line path A through the first latching valve 16 from the source 12 of pressurized air flow to the port 28 of the flow control valve 14, with each pressurized air pulse being equal in duration to the amount of time that the first latching valve 16 remains at the opened condition during each toggle cycle. The pulses of pressurized air flow communicated along the path A pneumatically causes the flow control valve 14 to move toward its fully open position through a distance proportionate to the amount of time that the first latching valve 16 remains open during each toggle cycle.

Conversely, with the first latching valve 16 maintained in the closed condition, cycling or toggling of the second latching valve 18 between closed and opened conditions will vent pulses of pressurized air flow along a dashed line path B through the first and second latching valves 16, 18 from the flow control valve 14 to the external atmosphere, with each vented pressurized air pulse being equal in duration to the amount of time that the second latching valve 18 remains at the opened condition during each toggle cycle. The pulses of vented pressurized air flow communicated along the path B permits a shaft 36 in the flow control valve 14 to retract due to the bias of a spring 38 therein and thereby permit the flow control valve 14 to move toward its closed position through a distance corresponding or proportional to the amount of time that the second latching valve 18 remains open during each toggle cycle.

From the above description, it can be readily understood that by coordination of cycling or toggling of the respective first and second latching valves 16, 18 between their closed and opened conditions, the flow control valve 14 can be moved to and placed at any selected intermediate "percentage" or partially opened position between its closed position and fully opened position and thereby proportion the flow pressure from the wellhead to the sales line.

A pressure transducer (not shown) can be used downstream of the flow control valve 14 to monitor and determine what is the value of the flow pressure being released into the sales line. The valve system 10 described above permits the percentage opening of the flow control valve 14 so as to control and regulate the flow pressure and velocity of the oil and gas downstream of the flow control valve 14. Not only does this avoid "off the chart" and gas suspended oil giveaways to the gas company purchaser, the valve system 10 also prolongs the productive life of a well by permitting the well producer to be able to constantly monitor the velocity of gas from the well so as to determine when it begins a decline trendline indicating that well is starting to die. The percentage opening of the flow control valve 14 can be adjusted in order to boost the flow velocity and prolong the productive life of the well.

While the valve system 10 of the invention has been described in its preferred application with a gas and oil production wellhead, it can be readily appreciated that there are other applications for the system. Basically, the valve system 10 can be employed whenever a preset biasing force or pressure is used to hold a mechanism at a first home position and an external supply of pressurized air is used to overcome the biasing force to drive the mechanism toward a second extreme position. The use of the valve system 10 of the invention will permit the mechanism to be incrementally moved and retained at any intermediate position between the two extreme positions.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A valve system for proportioning and controlling gas flow, said valve system comprising:
   (a) a source of pressurized air flow;
   (b) a flow control valve capable of pneumatic actuation between fully opened and closed positions corresponding permitting and preventing gas flow therethrough and to selected intermediate positions progressively increasing and decreasing between fully closed and opened positions to provide proportionately greater and lesser opening of said flow control valve and magnitude of the pressure and velocity of gas flow therethrough;
   (c) a first latching valve connected to said source of pressurized air flow, to said flow control valve and to a vent line and being switchable between an opened condition in which communication of pressurized air flow is only provided therethrough from said source of pressurized air flow to said flow control valve and a closed condition in which communication of pressurized air flow is only provided therethrough from said flow control valve to the vent line;
   (d) a second latching valve connected to the vent line from said first latching valve and to atmosphere and being switchable between an opened condition in which communication of pressurized air flow is only provided therethrough from the vent line to atmosphere and a closed condition wherein no communication of pressurized air flow is provided therethrough; and
   (e) a control mechanism operable to cause selective and separate switching of said first and second latching valves between said respective opened and closed conditions in a coordinated manner which causes pneumatic actuation of said flow control valve to any of said selected intermediate positions between said fully opened and closed positions.

2. The valve system of claim 1 wherein said flow control valve is interposed in a gas flow line between an upstream portion and a downstream portion thereof.

3. The valve system of claim 1 wherein said first latching valve has a first port connected to said pressurized air flow source, a second port connected to said flow control valve, and a third port connected to the vent line, said first latching valve being switchable between opened and closed conditions such that in said opened condition communication of pressurized air flow is only provided therethrough from said first port to said second port thereof causing said proportionately greater or lesser opening of said flow control valve and magnitude of pressure and velocity of gas flow through said flow control valve, whereas in said closed condition communication of pressurized air flow is only provided therethrough from said second port to said third port to said vent line.

4. The valve system of claim 1 wherein said second latching valve has a first port connected to the vent line from said first latching valve and a second port venting to atmosphere, said second latching valve being switchable between opened and closed conditions such that in said opened condition communication of pressurized air flow is only provided therethrough from said first port to said second port thereof and thus vented to atmosphere whereas in the closed condition no communication of pressurized air flow is provided therethrough.

5. The valve system of claim 1 wherein said first and second latching valves are solenoid-operated latching valves.

6. The valve system of claim 5 wherein said control mechanism applies predetermined first and second electrical pulses respectively to said first and second latching valves to actuate them between said respective opened and closed conditions.

7. The valve system of claim 1 wherein said first and second latching valves are capable of switching between said respective opened and closed conditions in a fraction of the time it takes said pneumatic actuation of said flow control valve to change between said fully closed and opened positions thereof thereby permitting said pneumatic actuation of said flow control valve to any of said selected intermediate positions and said increasing and decreasing proportionate opening of said flow control valve.

8. The valve system of claim 1 wherein said flow control valve is biased to normally assumes said fully closed condition and requires a supply of pressurized air above a predetermined level to pneumatically change said flow control valve to said fuller open position against said bias thereof.

9. The valve system of claim 8 wherein said flow control valve will retain said supply of pressurized air therein and thereby remain at said fully opened position until communication is provided to atmosphere by said first and second latching valves for venting a selected portion of said supply of pressurized air to atmosphere to cause proportionate opening of said flow control valve between said fully opened and closed positions.

10. In combination with a gas flow line, a valve system for proportioning and controlling flow of gas in said gas flow line, said valve system comprising:
   (a) a source of pressurized air flow;
   (b) a flow control valve interposed said gas flow line and capable of pneumatic actuation between a fully opened position permitting gas flow through said flow control valve from an upstream portion of said gas flow line to a downstream portion thereof at a maximum magnitude of pressure and velocity and a fully closed position permitting gas flow through said flow control valve from said upstream portion of said gas flow line to said downstream portion thereof at a minimum magnitude of pressure and velocity, said flow control valve further capable of pneumatic actuation to selected intermediate positions between said fully closed and opened positions providing proportionately greater and lesser opening of said flow control valve and magnitude of the pressure and velocity of gas flow through said flow control valve and in said downstream portion of said gas flow line;
   (c) a first latching valve having a first port connected to said source of pressurized air flow, a second port connected to said flow control valve and a third port connected to a vent line, said first latching valve being switchable between opened and closed conditions such that in said opened condition communication of pressurized air flow is only provided therethrough from said first port to said second port thereof causing said proportionately greater and lesser opening of said flow control valve and magnitude of pressure and velocity of gas flow through said flow control valve and in said downstream portion of the gas flow line, whereas in said closed condition communication of pressurized air flow is only provided therethrough from said second port to said third port to said vent line;
   (d) a second latching valve having first port connected to said vent line from said third port of said first latching valve and a second port venting to atmosphere, said second latching valve being switchable between opened and closed conditions such that in said opened condition communication of pressurized air flow is only provided therethrough from said first port to said second port thereof and thus vented to atmosphere whereas in the closed condition no communication of pressurized air flow is provided therethrough; and
   (e) a control mechanism operable to cause selective and separate switching of each of said first and second latching valves between said respective opened and closed conditions in a coordinated manner which causes pneumatic actuation of said flow control valve to any of said selected intermediate positions between said fully opened and closed positions.

11. The valve system of claim 10 wherein said first and second latching valves are solenoid-operated latching valves.

12. The valve system of claim 11 wherein said control means applies predetermined first and second electrical pulses respectively to said first and second latching valves to actuate them between their opened and closed conditions.

13. The valve system of claim 11 wherein said first and second latching valves are capable of switching between said respective opened and closed conditions in a fraction of the time it takes said pneumatic actuation of said flow control valve to change between said fully closed and opened positions thereof thereby permitting said pneumatic actuation of said flow control valve to any of said selected intermediate positions and said increasing proportionate opening of said flow control valve.

14. The valve system of claim 10 wherein said flow control valve is biased to normally assumes said fully closed condition and requires a supply of pressurized air above a predetermined level to pneumatically cause opening of the flow control valve against said bias.

15. The valve system of claim 14 wherein said flow control valve will retain said supply of pressurized air therein and thereby remain at said opened condition until communication is provided to atmosphere by said first and second latching valves for venting a selected portion of said supply of pressurized air to atmosphere to proportionately reduce said opening of said flow control valve.

* * * * *